Oct. 17, 1967 H. R. SCHMIDT 3,348,065

DATA ANALYZING CIRCUIT EMPLOYING INTEGRATOR HAVING FIRST AND SECOND DISCHARGE PATHS WITH RESPECTIVELY FIRST AND SECOND DISCHARGE RATES

Filed July 14, 1964

INVENTORS

HERBERT SCHMIDT

BY Ronald J. Clark

ATTORNEY

United States Patent Office 3,348,065

Patented Oct. 17, 1967

3,348,065

DATA ANALYZING CIRCUIT EMPLOYING INTEGRATOR HAVING FIRST AND SECOND DISCHARGE PATHS WITH RESPECTIVELY FIRST AND SECOND DISCHARGE RATES

Herbert R. Schmidt, Minneapolis, Minn., assignor to International Business Machines Corporation, New York, N.Y., a corporation of New York Filed July 14, 1964, Ser. No. 382,587
7 Claims. (Cl. 307—88.5)

ABSTRACT OF THE DISCLOSURE

This invention uses a differential amplifier as a decision making element. The composite data signal is applied through a voltage divider to a diode rectifier circuit having variable time-constant properties. The rectified signal is stored in the time-constant element and its time-variable voltage characteristic is employed as the reference voltage input to the differential amplifier. The data signal is also applied directly to the differential amplifier as its second input signal.

This invention relates to data anlyzing systems for use with a character scanning system and, more particularly, to an improved data examination circuit employing a differential amplifier as its decision making element and a rectifier circuit having time-constant properties at its reference voltage source.

It is well known to apply a data signal sequence with superimposed noise and/or a superimposed direct current component to a threshold decision making circuit passing only data signals having a predetermined minimum amplitude. In this manner, noise signals or other uncontrollable voltage variations are prevented from reaching subsequent utilizing devices and from being mistaken as signals. Such suppression of all pulses not exceeding a predetermined minimum amplitude may, for example, be achieved by means of biased diodes or by differential amplifiers. At any rate, a so-called reference voltage is required which is higher than all undesirable data signals and, which is lower than the smallest data signal that may occur. In many applications, such as in optical scanners of reading machines or in capacitively operating punched card reading arrangements, both the level of the data signals and the level of the noise plus the level of the direct current component vary to such an extent that no satisfactory results can be obtained with a fixed reference voltage.

Therefore, variable reference voltages are employed which are adjusted either manually or by special scanning elements. However, such arrangements tend to operate unsatisfactorily in all cases having rapidly changing signal levels. That is, the data signal level at the point of the actual scanning process differs from the signal level at the reference scanning process. Moreover, such arrangements have another serious disadvantage. For, if at any time, a line extends in the scanning direction and in the range of both scanning devices, the arrangement responds to the blackness of that area and produces a reference voltage causing the scanning signals produced by such a line to be associated with unblackened areas. In such arrangements, it is impossible to avoid reducing the sensitivity of the scanning circuitry employed. When the black lines of normal characters are greatly magnified, they exhibit a large number of white and gray areas. The scanning of these very small white or gray areas produces pulses indicating the presence of a white area even with reduced scanning sensitivity. Such misleading operation renders the recognition of the respective character difficult or even impossible.

Therefore, arrangements of a sometimes rather complex nature have been proposed in the past, which utilize a delay line to generate a reference or average signal, and employ the center tap of the delay line to furnish the data signal. A reference signal generated in this manner increases the sensitivity of the arrangement in sensing a black line extending in the scanning direction to such an extent that any white areas included in such line are neglected. In this manner, the probability is taken into account that, when scanning a long black line, a signal indicating a small white area is more likely due to a scanning error than such a signal occurring during the scanning of an extensive white region. Because of this probability, it is necessary to increase the sensitivity while scanning a long black region. Thus, a reference voltage producing arrangement in which the change in sensitivity occurs in the opposite direction is not suited for use in optical reading machines, punched card readers or other similar reading machines.

Accordingly, it is an object of the instant invention to provide a simplified data analyzing circuit.

It is another object of the instant invention to provide a data analyzing circuit which is less sensitive to rapid changes in data signal levels and more sensitive to less rapid changes in the direct current level and noise level accompanying the data level.

It is an additional object of the instant invention to provide a data analyzing signal employing a controllable time constant element responsive to the input voltage level.

It is a still further object of the instant invention to provide a data analyzing circuit which has increased sensitivity when scanning a long black region of a character.

According to these objects the instant invention contemplates the use of a differential amplifier as the decision making element. The composite data signal is applied through a voltage divider to a diode rectifier circuit having variable time-constant properties. The rectified signal is stored in the time-constant element and its time-variable voltage characteristic is employed as the reference voltage input to the differential amplifier. The data signal is also applied directly to the differential amplifier as its second input signal.

The foregoing and other objects, features and advantages of the invention will be apparent from the following more particular description of a preferred embodiment of the invention, as illustrated in the accompanying drawings; wherein FIGS. 1 and 3 show block diagrams of the instant invention;

Figure 1:
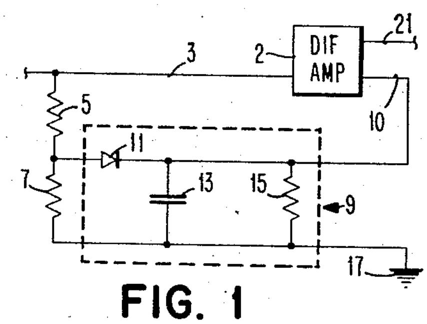
Figure 2:
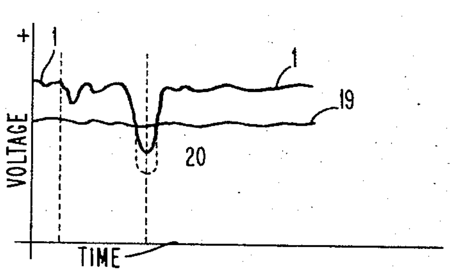
FIGS. 2 and 4 are schematic diagrams of the voltage characteristics produced in the operation of the circuits shown in FIGS. 1 and 3.

Referring to FIGS. 1 and 2, a composite signal 1 is applied directly to one input of a differential amplifier 2 by a line 3 and to the other input of the differential amplifier 2 by a voltage divider comprising a pair of serially connected resistors 5 and 7 and a diode rectifier circuit 9 having time constant properties connected between the junction or resistors 5 and 7 and a second input line 10 of the differential amplifier 2. A diode 11 is connected to the junction of the resistors 5 and 7 and is connected to one side of a capacitor 13. The junction of the diode 11 and the capacitor 13 is connected to a resistor 15 and to the input line 10 of the differential amplifier 2. The other ends of the resistors 7 and 15 and the capacitor 13 are connected to ground potential 17. The diode 11 is connected to pass signals more positive than the reference voltage 19 developed at its junction with the capacitor 13 and the resistor 15. Signals 20 appearing at an output line 21 of the differential amplifier 2 correspond to those portions of the composite signal 1 which intersect the potential generated by the diode rectifier circuit 9.

It should be noted that the time constant on the RC element comprising the capacitor 13 and the resistor 15 should be large in respect to the relation of the data signal so that the sensitivity of the RC elements will not decrease too rapidly during the application of a plurality of data signals.

Figure 3:
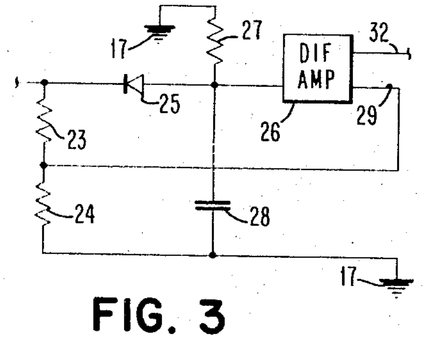
Figure 4:
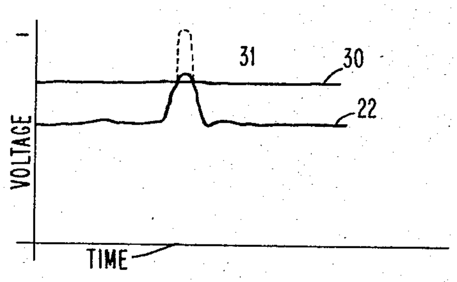

FIGS. 3 and 4 illustrate the same circuit connected for processing data signals of the opposite polarity. A composite signal 22 is applied both to a voltage divider network comprising a pair of serially connected resistors 23 and 24 and to a diode 25. The other end of the diode 25 is connected directly to one input of a differential amplifier 26 and to one side of a resistor 27 and a capacitor 28. The other ends of the resistors 24 and 27 and the capacitor 28 are connected to ground 17. The junction of the resistors 23 and 24 is connected to a second input line 29 of the differential amplifier 26. The diode 25 is connected to pass signals less positive than the reference potential 30 developed at its junction with the capacitor 28 and the resistor 27. Signals 31 appearing at an output line 32 of the differential amplifier 26 correspond to those portions of the composite signal 22 which intersect the value of the reference potential 30.

Figure 5:
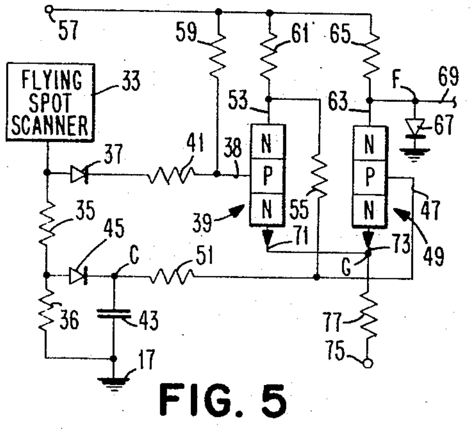
FIG. 5 is a circuit diagram of a preferred embodiment of this invention.
Figure 6:
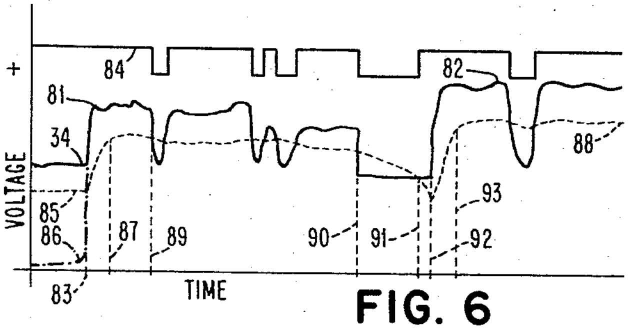

Referring to FIGS. 5 and 6, there can be seen the preferred embodiment of the instant invention employed to process the optical signals generated by a flying spot scanning circuit 33. This circuit is well known and need not be described in detail. A composite signal 34 is generated by this circuit comprising an analog signal having two principal voltage levels; one of which is associated with the scanning of a black area, and the other of which is associated with the scanning of a white area. However, since various shades of black and white are being scanned, the voltage level corresponding to each principal level tends to vary. During the scanning of a single line, the signal level associated with a black and white signal does not change abruptly giving a relatively steady or slowly changing mean value. But, the voltage change corresponding to the difference between a black and a white signal intersects this mean value regardless of the direction of the voltage change between signals. A noise signal and/or a direct current signal is superimposed upon this analog signal comprising a composite signal. Generally, the superimposed signal tends to increase the mean value of the analog signal and it changes relatively slower than the changes in the analog signal.

The composite signal 34 is applied to a voltage divider consisting of resistors 35 and 36 and is applied to a diode 37. The other end of the diode 37 is connected to a base lead 38 of a transistor 39 by a balancing resistor 41. The junction of the resistors 35 and 36 is connected to one side of a capacitor 43 by a diode 45. The same side of the capacitor 43 is connected to the base lead 47 of a second transistor 49 by a resistor 51 and it is connected to a collector lead 53 of the transistor 39 by the resistor 51 and a resistor 55. The junction of the base lead 38 and the resistor 41 is connected to a source of negative potential 57 by a resistor 59. The collector lead 53 is connected to the potential source 57 by a resistor 61. A collector lead 63 of the transistor 49 is connected to the potential source 57 by a resistor 65 and it is connected to ground 17 by a diode 67. Output signals are taken from the circuit at a point $f$ by a line 69. The diode 67 prevents the potential level at point $f$ from becoming too positive with respect to ground. The diodes 37 and 45 pass portions of the composite signal more positive than the back biasing potential available at the junction of the diode 37 and the resistor 41, and at a point $c$ respectively. Emitter leads 71 and 73 of the transistor 39 and 49 are connected together at a point $g$ and are connected to a positive potential source 75 by a common emitter resistor 77. The other end of the resistor 36 and the capacitor 43 are connected to ground 17.

In the absence of the composite input signal 34, the transistor 49 conducts and the transistor 39 is cut off and the condenser 43 is discharged to the level of the potential source 57 through the resistors 51, 55 and 61. On the application of a composite input signal 34, the transistor 49 is cut off and the transistor 39 conducts, driving the collector lead 53 of the transistor 39 towards the level of the potential source 75. In this case, the condenser 43 is discharged at a lower speed toward the new potential level at the collector 53. This lowering of the discharge rate corresponds to the larger time constant associated with the new discharge path of the capacitor 43 through the resistors 51 and 55 toward the new lower potential available at the junction of the collector lead 53 of the transistor 39 and the resistor 61.

FIG. 6 illustrates the configuration of a composite signal 34 having a maximum voltage level varying between a value at 81 and 82 and which has superimposed thereon a low-frequency noise level and the over-all level of which may be modified, for example, by temperature influences or by transient processes, by the factor three. The composite signal is turned on at time 83 and an output waveform 84 shows no change in the voltage level at point $f$. Regardless of the composite signal having a potential level at 85 or 86, the condenser 43 is fully charged at time 87 in accordance with the ratio of resistors 35 and 36.

Starting at this point, the reference signal 88 present at point $c$ on the capacitor 43 continues to follow the variations in the composite signal 34, as the condenser 43 is charged through resistor 35, and discharged to the level of the potential source 57 through resistors 51, 55 and 61. The signal occurring at time 89 causes the transistor 39 to conduct and shifts the potential at the collector 53 of this transistor into the positive range, or a lowering of the difference available in the first discharge path. Therefore, the change in the discharge of the capacitor 43 takes place more slowly through the resistors 51 and 55 than with transistor 39 non-conductive. After the termination of this signal, the amplitude of the composite signal 34 remains constant for some time after which it drops slowly; the amplitude of the reference voltage 88 following it in accordance with the dividing ratio of the voltage divider comprising the resistors 35 and 36. At time 90, the composite signal 34 is cut off entirely. The transistor 39 is turned on, and the discharge of the condenser 43 occurs at an initially slow speed through the resistors 51 and 55 toward the potential level present at the junction of the resistors 35 and 36. At time 91, the reference signal 88 drops below the composite signal 34, whereby the transistor 39 is cut off and the rapid discharge of the capacitor 43 is initiated. At time 92, the composite signal 34 begins to increase again, so that the condenser 43 is charged through the resistor 35 and the reference voltage 88 rises and again follows the configuration of the composite signal 34. The capacitor 43 is again fully charged at time 93. The turning off of the composite signal 34 at time 90 represents the completion of a single line scan and the flyback time before the beginning of a new scanning line.

The reference voltage 88 is reduced at time 92 allowing a new reference level to be set up for each new scan, which new level accurately represents the new noise, and background signals existing during this scan.

Figure 7:
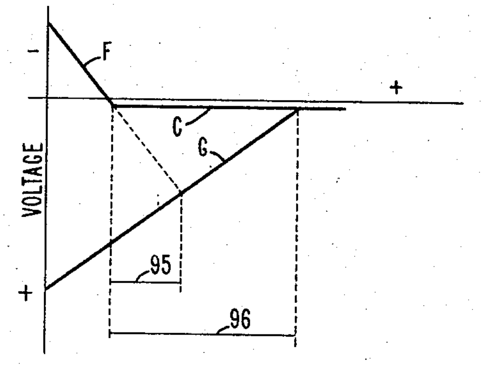
FIGS. 6 and 7 show voltage waveforms representing the voltage characteristics produced in the operation of the embodiment shown in FIG. 5.

The diode 67 causes the adjustment range of the circuit to be expanded. As may be seen from FIG. 7, the adjustment starts when the voltage F at the point $f$ becomes equal to the voltage C at the point $c$. The voltages F and G (points $f$ and $g$, FIG. 5) approach each other with C increasing. Their point of intersection defines the end of the range of adjustment when the diode 67 is not provided. The range of adjustment is indicated by a line 95. By the use of the diode 67, the voltage F is held constant in a predetermined range, so that at its point of intersection with G it is shifted to the right, thus causing the adjustment range to be expanded and equal to a line 96.

In operation, the capacitor 43 quickly charges to a percentage of the composite signal 34 when that signal is first available at time 83. This level of the composite signal 80 includes the noise component and the varying direct current component. Additionally, the reference voltage follows closely the changing composite signal level as the noise and the direct current component change. However, during rapid changes of the composite signal level which correspond to a data signal, as at time 89, the reference voltage level 88 changes only slightly. These different rates of change in the reference voltage level 88 are caused by the controllable time constant element employed in the circuit. In one configuration, the controllable time constant element comprises the resistors 51, 55 and 61 and the voltage source 57. In another configuration, the controllable line constant element comprises the resistors 51 and 55 and the voltage source at the junction of the collector lead 53 and the resistor 61.

While the invention has been particularly shown and described with reference to a preferred embodiment thereof, it will be understood by those skilled in the art that various changes in form and details may be made therein without departing from the spirit and scope of the invention.

What is claimed is:

1. A data analyzing circuit comprising:
means for generating a composite signal,
said composite signal including a variable analog signal having relatively fast changes about its mean voltage level and a second signal superimposed upon said analog signal having relatively slow changes in mean voltage level,
means including an integrator for generating a reference voltage proportional to said analog signal,
means for defining a first discharge path having a first rate of discharge for said integrator,
means for defining a second discharge path having a second rate of discharge for said integrator,
means responsive to said composite signal for connecting said first discharge means to said integrator,
said last-mentioned means responsive to said relatively fast changes and said reference voltage for connecting said second discharge means to said integrator, and
said integrator being discharged at a slower rate by said first discharge means than by said second discharge means.

2. A data analyzing circuit comprising:
means for generating a composite signal,
said composite signal including a variable analog signal having relatively fast changes about its mean voltage level and a second signal superimposed upon said analog signal having relatively slow changes in mean voltage level,
means including an integrator for generating a reference voltage proportional to said composite signal and greater than said means voltage level,
means for defining a first discharge path having a first rate of discharge for said integrator,
means for defining a second discharge path having a second rate of discharge for said integrator,
means responsive to said composite signal for connecting said first discharge means to said integrator,
said last-mentioned means responsive to said relatively fast changes and said reference voltage for connecting said second discharge means to said integrator, and
said integrator being discharged at a slower rate by said first discharge means than by said second discharge means.

3. In a data analyzing circuit as recited in claim 2, said reference voltage generating means further comprises:

a voltage divider connected to said composite signal generating means,
a voltage tap connected to said voltage divider for obtaining a voltage proportionately less than said composite signal and greater than said mean voltage level, and
means connected between said tap and said integrator for rectifying said proportional signal.

4. A data analyzing circuit comprising:
means for generating a composite signal,
said composite signal including a variable analog signal having relatively fast changes about its mean voltage level and a second signal superimposed upon said analog signal having relatively slow changes in mean voltage level,
means including an integrator for generating a reference voltage proportional to said composite signal and greater than said mean voltage level,
means for defining a first discharge path having a first rate of discharge for said integrator,
means for defining a second discharge path having a second rate of discharge for said integrator,
means responsive to said composite signal for connecting said first discharge means to said integrator,
said last-mentioned means responsive to said relatively fast changes and said reference voltage for connecting said second discharge means to said integrator, and
said last-mentioned means generating a digital output signal responsive to said relatively fast changes in said analog signal.

5. In a data analyzing circuit as recited in claim 4, said means for defining said discharge paths comprising:
a first impedance element in said first discharge means connected to said integrator,
a first potential source in said first discharge means connected to said first impedance element,
a second impedance element in said second discharge means connected to said integrator,
a second potential source in said second discharge means connected to said second impedance element,
said first impedance element having less impedance than said second impedance element,
said potential source being less than said second potential source, and
the increase in potential diffrence being controlling for increasing the discharge rate of said second discharge means.

6. A data analyzing circuit comprising:
means for generating a composite signal,
said composite signal including a variable analog signal having relatively fast changes about its mean voltage level and a second signal superimposed upon said analog signal having relatively slow changes in mean voltage level,
means for generating a reference voltage proportional to said composite signal,
an integrator responsive to said reference voltage generator having variable time constant properties,
means responsive to said composite signal and said reference voltage signal and connected to said integrator for changing said time constant properties.

7. A data analyzing circuit comprising:
means for generating a composite signal,
said composite signal including a variable analog signal having fast changes about its mean voltage level and a second signal superimposed upon said analog signal having slow changes in mean voltage level,
a first transistor having base, collector and emitter leads,
a second transistor having base, collector and emitter leads,
means for connecting said composite signal to said base lead of said first transistor,
means responsive to said composite signal for generating a reference signal proportional to said composite signal,
a capacitor,
a diode connecting said proportional voltage generating means to said capacitor,
first impedance means for connecting said capacitor to the base lead of said second transistor,
a first potential source,
second impedance means connected between said first potential source and said collector lead of said first transistor,
biasing means connected between said first potential source and said base lead of said first transistor for biasing said first transistor off in the absence of said composite signal,
current limiting means connected between said collector lead of said second transistor and said first potential source,
a second source, said emitter leads of said transistors being connected in common to said second potential source,
said second transistor being biased on in the absence of said composite signal,
a third impedance means connected between said first and second impedance means,
said first transistor being turned on by said composite signal and being turned off by said fast changes in said analog signal, and
a diode connected to the collector lead of said second transistor.

References Cited

UNITED STATES PATENTS

| | | | |
|---|---|---|---|
| 3,064,144 | 11/1962 | Hardy | 307—88.5 |
| 3,138,764 | 6/1964 | Dalton et al. | 328—182 |
| 3,168,658 | 2/1965 | Marshall | 307—88.5 |

J. S. HEYMAN, *Primary Examiner.*